United States Patent [19]

Kassman et al.

[11] Patent Number: 5,515,794
[45] Date of Patent: May 14, 1996

[54] PARTIAL OXIDATION PROCESS BURNER WITH RECESSED TIP AND GAS BLASTING

[75] Inventors: Jerrold S. Kassman, Long Beach; Allen M. Robin, Anaheim; John D. Winter, Yorba Linda; James K. Wolfenbarger, Torrance, all of Calif.

[73] Assignee: Texaco Inc., White Plains, N.Y.

[21] Appl. No.: 376,520

[22] Filed: Jan. 23, 1995

[51] Int. Cl.$^6$ .................................................. F23C 1/10
[52] U.S. Cl. ..................... 110/261; 110/260; 110/265; 431/160
[58] Field of Search ................................. 110/260, 261, 110/262, 263, 264, 265; 431/160

[56] References Cited

U.S. PATENT DOCUMENTS

| | | |
|---|---|---|
| 891,349 | 6/1908 | Loder . |
| 1,163,650 | 12/1915 | Fogler . |
| 2,338,623 | 1/1944 | Crowe . |
| 2,732,257 | 1/1956 | Cress . |
| 3,297,411 | 1/1967 | Dear . |
| 3,387,784 | 6/1968 | Ward, Jr. . |
| 3,612,738 | 10/1971 | Jones et al. . |
| 4,155,702 | 5/1979 | Miller et al. . |
| 4,216,908 | 8/1980 | Sakurai et al. . |
| 4,443,228 | 4/1984 | Schlinger . |
| 4,644,878 | 2/1987 | Nood et al. ........................ 110/264 |
| 4,679,512 | 7/1987 | Skoog ................................ 110/262 |
| 4,858,538 | 8/1989 | Kuypers et al. .................... 110/264 |
| 4,924,784 | 5/1990 | Lennon et al. ..................... 110/265 |
| 4,928,605 | 5/1990 | Suwa et al. ........................ 110/261 |
| 5,127,346 | 7/1992 | Kepplinger et al. ............... 110/264 |
| 5,129,333 | 7/1992 | Fredrick et al. ................... 110/264 |
| 5,135,169 | 8/1992 | Mensink . |
| 5,261,602 | 11/1993 | Brent et al. . |
| 5,273,212 | 12/1993 | Gerharous et al. . |

FOREIGN PATENT DOCUMENTS 0105809  6/1985  Japan ..................... 110/264

*Primary Examiner*—Thomas E. Denion
*Attorney, Agent, or Firm*—James L. Bailey; Kenneth R. Priem; William J. Beard

[57] ABSTRACT

An improved burner for partial oxidation process gas generators is provided which has annular passages formed between coaxially aligned conduits extending from upstream sources to the downstream reaction zone. An outer coolant jacket, internally baffled from optimum coolant flow and sized for minimum downstream area surrounds a recessed and fuel/oxidizer delivery conduit ending in a nozzle. The central delivery conduit is not attached to the coolant jacket and the annular space between them is connected to a high pressure supply of relatively inert gas which can periodically be vented through the annular space to prevent slag build up on the nozzle or coolant jacket.

7 Claims, 1 Drawing Sheet

PARTIAL OXIDATION PROCESS BURNER WITH RECESSED TIP AND GAS BLASTING

BACKGROUND OF THE INVENTION

This invention relates to an improvement in burner design and performance for use in the manufacture of gaseous mixtures comprising $H_2$ and CO such as synthesis gas, fuel gas, and reducing gas by the partial oxidation of pumpable slurries of solid hydrocarbonaceous fuels in a liquid carrier or liquid hydrocarbonaceous fuels.

Annular type burners have been employed for introducing feedstreams into a partial oxidation gas generator. For example, in co-assigned U.S. Pat. No. 5,261,602, an improved burner of the "hot tip" design using a porous ceramic tip is employed in such a system. Such burners are used to simultaneously introduce the various feedstreams into the partial oxidation reactor. Single, double and triple annulus burners are shown, for example in co-assigned U.S. Pat. No. 3,528,930; 3,758,037; and 4,443,230, respectively, for the introduction of plural feedstreams into such systems.

In the use of such burners in pumpable slurry mixtures of hydrocarbonoaceous fuels in a liquid carrier or in the use of certain liquid hydrocarbonaceous fuels, a problem that is most often encountered when working with high ash feeds is the problem of slag deposits on the burner body. Such deposits create unstable gasifier operation. A slag deposit forms on the burner body and grows until it interferes with the burner spray pattern of fuel and free oxygen containing gas. This results in increased and fluctuating carbon dioxide and methane levels in the produced gas and causes the gasifier temperature to rise to the point where the gasifier must be shut down for safety reasons. Some particularly "dirty" feeds can have a particularly exacerbating effect on this problem. One such feed comprises coal and dirt with 30% to 40% of the solids as ash (i.e. inorganic) in a water slurry.

Such burners come into contact with recirculating gasses in the interaction zone that contact the outer surfaces of the burner. These gasses can have a temperature in the range of 1700° F. to 3500° F. Burners are cooled to withstand these temperatures by means of cooling channels through which a liquid coolant such as water is passed. Cooling coils are wrapped over the exterior surfaces of the burner along its length. Also the use of an annular shaped cooling chamber has been used to provide additional cooling at the burner face. Because of the heat flux from the radiant gasifier to the burner face, and through the burner face into the cooling liquid, thermal stress cracks can develop in the metal near the tip of a burner. These cracks can lead to flow modifications in the various feedstocks that can completely disable the burner.

SUMMARY OF THE INVENTION

Briefly, the present invention provides an improved burner body designed to reduce the potential for burner deposits that affect gasifier performance, and for reduced thermally induced metal fatigue cracking by mechanical decoupling of coaxially aligned, annular burner rings. This is accomplished in the present invention by decoupling the cooling water jacket from the spray nozzle and retracting the burner nozzle or nozzle assembly axially into the cooling water jacket to reduce radiant heat flow to the nozzle, by modifying the gas flow pattern around the burner nozzle to reduce particulate impact, by improving the cooling water flow pattern in the cooling water jacket to reduce jacket temperature and prevent adhesion of molten slag particles and by the creation of a gas purging and deposit blasting passage between the burner nozzle and the cooling water jacket. The outer coolant jacket also has reduced frontal area to minimize the surface area for molten slag deposit formation and to reduce radiation heat transfer, which along with the gas blasting passage makes it difficult for any deposit which might form to bridge the gap between the coolant jacket and the burner nozzle itself.

The above features and advantages of the invention may best be understood by reference to the following detailed description of the invention when taken in conjunction with the accompanying drawings. It will be understood that the drawings are intended as illustrative only and not as limitative of the invention.

DETAILED DESCRIPTION OF THE INVENTION

Figure 1:
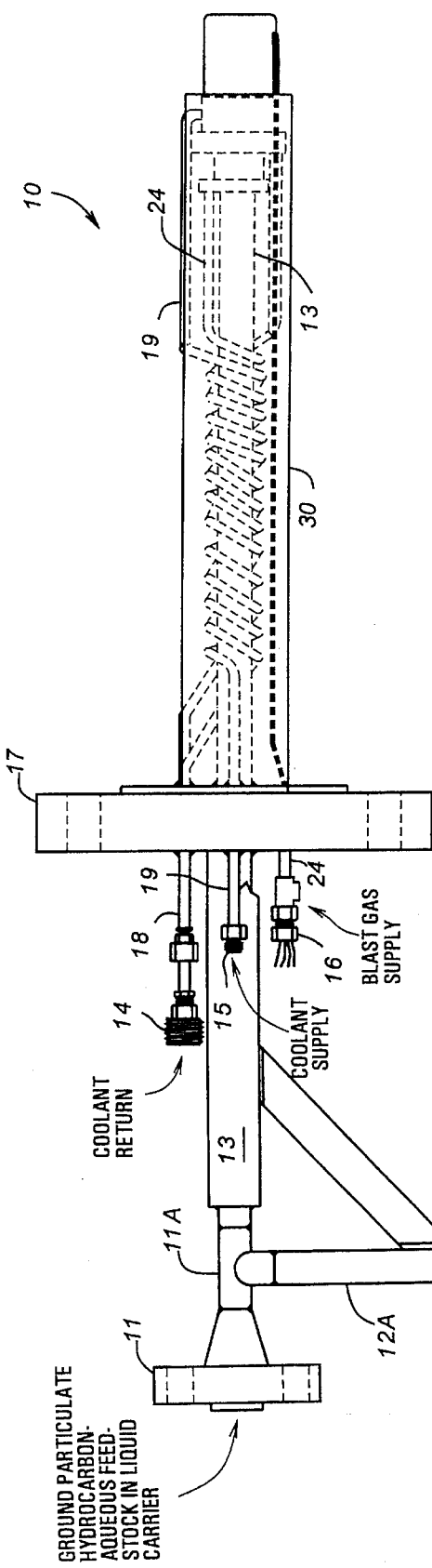
FIG. 1 is a schematic transverse or side view of a partial oxidation burner assembly according to the concepts of the present invention.

Referring initially to FIG. 1, a burner assembly for use in a partial oxidation reactor according to he concepts of the present invention is shown schematically. The detail of the form of the supply tube 13 of the burner assembly is not important with respect to the present invention. It will be understood that feedstock supply tube 13 may, if desired, be of single annulus, double annulus or triple annulus design as shown in co-assigned U.S. Pat. Nos. 3,528,930; 3,758,037 and 4,443,230 or even more multiple annuli, if desired. For purposes of describing the present invention the feedstock supply line or tube 13 will be taken generically to mean any such design feed tube for supplying feed to a non-catalytic partial oxidation reactor for the manufacture of synthesis gas, fuel gas or reducing gas. The feed may typically comprise a pumpable slurry of solid hydrocarbonaceous fuel ground up into a liquid carrier such as water or liquid hydrocarbon or inorganic solids in a liquid hydrocarbon and a free oxygen containing gas such as air with or without admixture with a temperature moderator. The supply end of the burner assembly of FIG. 1 is referred to as the upstream end and the reaction zone end, or nozzle end of the burner assembly is referred to as the downstream end.

The burner assembly of FIG. 1 is shown generally at 10. The free-oxygen containing gas at operating pressure as desired is supplied via a tubular conduit 12A attached to a flanged connector 12. Similarly, the pumpable slurry feedstock is supplied to the burner assembly 10 via tubular conduit 11A attached to a flanged connection 11 therefor. The hydrocarbon and oxygen feed tubes may be interchanged in a two stream burner without affecting the invention. Mixing of these components takes place internally according to feed tube design and the feedstock resulting therefrom enters the generic feedstock supply tube 13 at its upstream end which extends through a flanged connector 17 into the reactor vessel (not shown). Also exterior to the reactor vessel a coolant supply connector 15 affixed to a coolant supply tube 19 passes through the flanged bulkhead connector 12. A blast gas supply connector 16 is connected to a high pressure source (not shown) of an inert gas (such as $N_2$) for purposes to be described in more detail subsequently and is supplied to tubular conduit 24 for this purpose. Coolant return tube 18 also passes through the flanged bulkhead connector 17 and terminates in an exterior connector 14 for return of the heated coolant from the interior of the reactor vessel.

Figure 2:
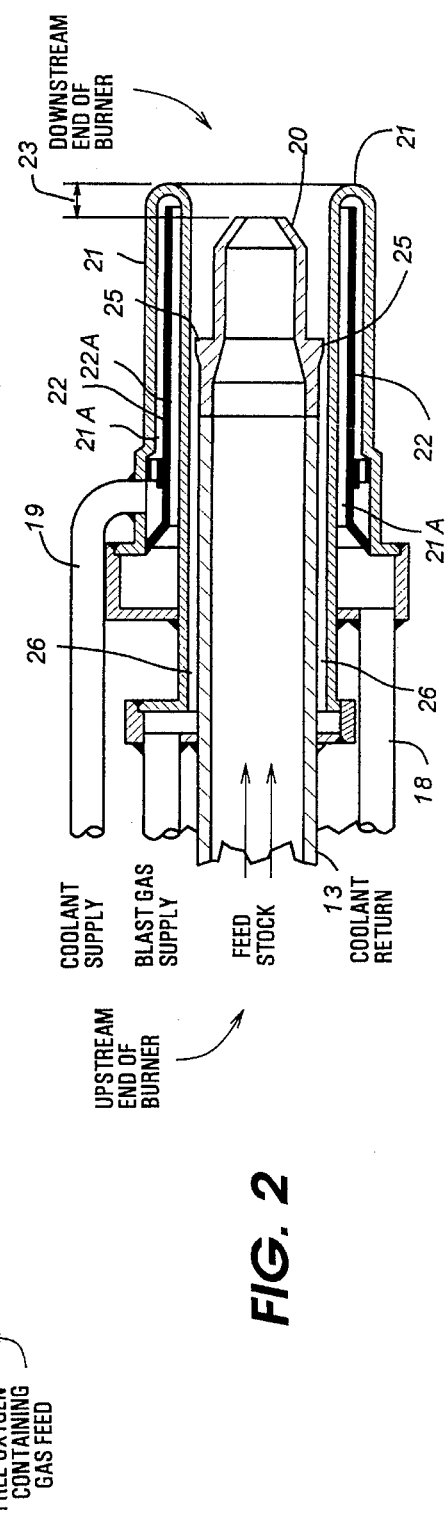
FIG. 2 is a larger scale detail of the burner tip or end of the assembly of FIG. 1 shown in a schematic longitudinal cross sectional view.

On the interior side of flanged connector 17 (to the reactor vessel) the coolant supply line 19 is helically wound about the exterior of the feedstock supply tube 13 along its length to supply coolant to the downstream burner tip and which is shown in more detail in the schematic cross sectional view of FIG. 2. It will be recalled that interior to the reactor vessel hot gasses in the temperature range of from 1700° F. to 3500° F. exist. In order to protect feed lines 13, 18, 19 and 24 from attack by condensing acid gas such as $HC_l$ in this region, they are all embedded in or potted in a special refractory material or ceramic.

In the vicinity of the burner tip assembly shown in FIG. 2 the temperature is in the range of 2300° F. to 3000F. Depending on the fuel and operating conditions of the unit, flyash, slag or particulate carbon soot can be produced along with the desired products such as $H_2$ and CO. One or more of $CO_2$, $H_2O$, $N_2$, A, $CH_4$, $H_2S$ and COS may also be present. As the burner tip is cooled by the flowing coolant in the coolant jacket 21 surrounding the recessed nozzle 20 delivering the feedstream to the reactant zone, deposits of slag or fly-ash can condense thereon. Such deposits can build up and disrupt the flow pattern of gasses in the downstream end of the burner thereby disabling the burner. To have the burner tip 20 below the slag sticking point in temperature, the nozzle on tip 20 is recessed axially inwardly by a distance 23 from the outer end 21A of coolant jacket 21 as shown in FIG. 2. Additionally coolant (water) 19 flowing through the jacket 21 has its channel depth minimized by use of an internal annular baffle wall 22 disposed as shown. Coolant from line 19 enters jacket 21 and flows along the outside surface of jacket 21 because of baffle 22 until it reaches the tip 21A of the cooling jacket 21. It returns via annulus 22A between the inner wall of jacket 21 to the coolant return conduit 18.

The nozzle 20 of the burner is supplied with a thickened wall portion or flange 25 which tends to keep the feedstock supply conduit 13 and nozzle 20 centered in coolant jacket 21. Periodically, high pressure inert gas, such as $N_2$, is supplied via conduit 24 to gas blast passage 24A where it can rush axially along passage 24A to exit into the reaction zone near the nozzle 20. These blasts of high pressure gas can blow away or blast off any molten slag tending to accumulate near the tip of nozzle 20 or in the passage 24A or to tip area 21A. Possible purge gas rates (depending on burner size) of 0–2000 standard cubic feet per hour (SCFH) at standard temperature and pressure, preferably in the range of 250 SCFH, are used for this purpose. A gas blast frequency of one 0.6 second blast every 10 minutes to every one minute can be used.

Moreover, the gas blast passage 24 between the burner tip on nozzle 20 and the cooling water jacket 21 minimizes the thermal stress on the nozzle 20 and coolant jacket 21. This leads to less thermal expansion and contraction of the nozzle 20 and the jacket 21 and thus to less metal fatigue from this source. Also by retracting the nozzle 20 the radiant heat load from the reaction zone is reduced as the feed spray itself forms a shield. This lowers nozzle 20 temperature and also reduces particulate impacting from the reaction zone onto the nozzle 20 leading to less possible slag buildup on the nozzle 20 or jacket 21.

The retraction distance 23 of nozzle 20 is, of course, a function of nozzle design, tubular diameters, feedstock flow rates, feedstock types, etc. to just short of feedstock spray impacting on cooling jacket 21. Distance 23 could vary, for example, from 0.1 inches to 0.85 inches with a preferable range from 0.3 inches to 0.4 inches for typical flow rates of feedstock, feedstock types, nozzle designs and tubular diameters typically in use.

A burner of this design has been tested with a particularly dirty feedstock of coal and dirt with 30% to 40% of the solid in the feedstock as ash. Surprisingly good results were obtained, one burner run of 101 hours and several shorter runs all of which resulted in negligible slag deposits on the burner. Previous burner designs run with this feedstock had never exceeded 6 hours in duration without a problem arising due to slag buildup on the burner.

In addition to the relatively unobstructed gas blast passage 24A and the nozzle 20 retraction by distance 23, the preferred burner design of the present invention uses a burner having a minimal surface area 21A tip exposed to the reaction zone along with the previously described superior water flow characteristics of the burner tip. The curvature of the cooling annulus tip 21A maximizes the ratio of cooled surface to incident radiation and thus lowers the temperature of the cooling tip area. The even distribution of coolant within the jacket 21 produced by the annular baffle 22 also allows for thinner metal in the jacket than previous designs. This augments the cooling effect of the moving coolant water as well. All of these features together act to reduce the outer surface temperature of the cooling jacket significantly and thus reduces the probability of molten slag particles sticking to the jacket 21 and forming a deposit. In particular the areas 20, 21A which are facing the relation zone and would normally be hottest due to incident radiation heating are cooled as much as possible. This ensures that the surface stays below the adhesion temperature of slag particles that might impact these surfaces. Also a small continuous purge of nitrogen through channel 24A reduces the diffusion of particle to these surfaces. Only a minuscule nitrogen flow which has a negligible impact on burner operation is needed for this purpose.

The foregoing description may make other changes and alternatives to the design shown apparent to those of skill in the art. It is the aim of the appended claims to cover all such changes and modifications as fall within the true spirit scope of the invention.

We claim:

1. A burner for the partial oxidation of a reactant fuel stream comprising a hydrocarbonaceous fuel or a pumpable slurry of solid hydrocarbonaceous fuel in a liquid carrier comprising a central fuel conducting conduit and a plurality of spaced coaxial conduits with down-flowing annular passages wherein said conduits are open to a reaction zone in a partial oxidation reactor at their downstream ends and wherein said central conduit terminates in a decreased diameter nozzle open to the reaction zone, said nozzle being axially recessed from said reaction zone into a surrounding coolant jacket, said jacket being a completely closed ended coaxially aligned member having a coolant supply line and a coolant return line both attached to its upstream end and an annular coaxially aligned internal baffle dividing the interior of said jacket into an input coolant flow passage and an output coolant flow passage, said passages being coaxially aligned with each other and said central conduit, and said baffle extending almost to the downstream closed end of said jacket and forming, internally to said jacket, said input and output coolant flow passages, and said downstream closed end of said jacket having as small a surface area as possible consistent with surrounding and being separated from said central conduit, the nozzle of said central conduit being recessed into the downstream end of said jacket as far as possible to avoid spray of material from said nozzle from contacting the interior wall of said jacket, and the annulus between the interior wall of said jacket and said central conduit forming a coaxially aligned annular shaped gas blast passage supplied at its upstream end from a source of high pressure relatively inert gas which is vented past said nozzle into the reaction zone.

2. The burner of claim 1 wherein said central conduit has a coaxially aligned shoulder upstream from said nozzle end for maintaining centralization within said gas blast passage of said nozzle.

3. The burner of claim 2 wherein the shape of said coolant jacket and interior baffle is such that coolant from said coolant supply line is routed first along the exterior wall of said jacket to its downstream end and then along its interior wall to said coolant return line.

4. The burner of claim 3 wherein said nozzle of said central conduit is recessed from 0.1 inches to 0.85 inches from the downstream and of said coolant jacket.

5. The burner of claim 4 wherein said nozzle of said central conduit is recessed from 0.3 inches to 0.4 inches from the downstream end of said coolant jacket.

6. The burner of claim 4 wherein a continuous flow of nitrogen gas is maintained in said gas blast passage to limit diffusion of said particles to the surface of the burner.

7. The burner of claim 6 wherein a sonic velocity blast of nitrogen gas is periodically also introduced into said gas blast passage to remove any deposits that may form on the surface of the burner.

* * * * *